United States Patent Office 3,386,983
Patented June 4, 1968

3,386,983
PROCESS FOR THE POLYMERIZATION OF ISOPRENE IN SOLUTION EMPLOYING AlR$_3$+TiCl$_4$ IN THE PRESENCE OF A POLYHALOGENATED LOWER OR CYCLOALIPHATIC HYDROCARBON
Josef Witte, Cologne-Stammheim, and Nikolaus Schön and Gottfried Pampus, Leverkusen, Germany, assignors to Farbenfabriken Bayer Aktiengesellschaft, Leverkusen, Germany, a corporation of Germany
No Drawing. Filed Oct. 7, 1965, Ser. No. 493,908
Claims priority, application Germany, Nov. 10, 1964, F 44,401; Jan. 30, 1965, F 45,109; Apr. 1, 1965, F 45,701
14 Claims. (Cl. 260—94.3)

ABSTRACT OF THE DISCLOSURE

Solution polymerization to obtain predominantly 1,4-cis-linkages employing aliphatic, cycloaliphatic and aromatic hydrocarbons as solvents and organometallic mixed catalyst of aluminum trialkyl and titanium tetrachloride, the polymerization being effected in the presence of 0.05 to 100 mols per mol of titanium tetrachloride of a polyhalogenated lower aliphatic or cycloaliphatic hydrocarbon.

It is known that isoprene can be polymerized so that the monomer units are linked in the 1,4-cis position by using organometallic mixed catalysts of aluminum trialkyls and titanium-IV-chloride. A polyisoprene which equals natural rubber in many respects is obtained.

However, this polymerization process has numerous serious disadvantages. If polymerization is carried out in aromatic hydrocarbons, a polyisoprene is obtained which is low in gel content and of relatively low molecular weight. Although a cis-1,4-polyisoprene of slightly higher molecular weight is obtained by using aliphatic solvents as polymerization medium, the gel content is then too high. Regardless of the solvent used, however, relatively high catalyst concentrations and long reaction times are needed in order to obtain 85 to 90% conversion of the monomer into 1,4-cis-polyisoprene. Thus, for example, polymerization processes have already been described in which catalyst concentrations of about 6% based on the amount of isoprene are employed and polymerization times of 18 to 25 hours are required for polymerizing 90% of the monomers. Apart from economic considerations, the large quantity of catalyst used necessitates a very cumbersome process of working up since the residues of catalyst have to be removed from the polymer if a high grade synthetic rubber is to be obtained.

In the process described in German Auslegeschrift 1,117,877, a polyisoprene yield of 5% is obtained when 0.44% by weight of catalyst is used for 100 g. of isoprene. The processes previously known thus require high catalyst concentrations and long reaction times to obtain commercially acceptable yields.

An improved process for the production of polyisoprene with predominantly 1,4-cis linkage by solution polymerization of isoprene in aliphatic or aromatic hydrocarbons as solvents, using organometallic mixed catalysts of aluminium trialkyls and titanium tetrachloride, has now been found wherein an at least dihalogenated lower aliphatic hydrocarbon is added to the polymerization reactants in a quantity of 0.05 to 100 mols per mol titanium tetrachloride.

In the polymerization of ethylene and α-olefines with organometallic mixed catalysts of aluminium trialkyls and titanium tetrachloride, the method of adding halogenated hydrocarbons such as CCl$_4$, CHCl$_3$, CCl$_3$Br, CF$_3$I, Cl$_3$CCOOH, CCl$_2$CN, (CH$_3$)$_3$CCl or C$_6$H$_5$CCl$_3$ for the purpose of increasing the catalyst activity has already been employed. However, all attempts to transfer this process to the polymerization of isoprenes have invariably led to useless catalysts which yield low molecular weight resins of irregular structure. 1,4-cis-polyisoprene has not been obtained by this process.

Surprisingly, the at least dihalogenated aliphatic hydrocarbons used according to the invention increase the catalyst activity in isoprene polymerization very considerably. The quantity of catalyst can therefore be considerably reduced whilst the speed of polymerization nevertheless greatly increases without the structure of the polymers being altered. Polymers having predominantly 1,4-cis linkages are obtained. This effect is limited to those halogenated hydrocarbons in which at least one of the carbon atoms carries two halogen atoms or at least two adjacent carbon atoms carry one halogen atom each. The preferred halogens are chlorine and bromine. Especially suitable for the process are alkanes with 1 to 6, or cycloalkanes with 5 to 7 carbon atoms, at least one carbon atom of which carries two halogen atoms or at least two adjacent carbon atoms of which carry a halogen atom each. Certainly two or even three carbon atoms of the alkanes and cycloalkanes may carry two halogen atoms. Also e.g. three or four carbon atoms may carry one halogen each, provided at least two of these carbon atoms are neighbours. Especially suitable are those alkanes in which the terminal carbon atom is doubly halogenated, for example 1:1-dichloroalkanes having 1 to 6 carbon atoms and α;α;ω:ω-tetrachloroalkanes having 2 to 6 carbon atoms and the corresponding bromalkanes.

The following are examples of suitable di- and polyhalogenated aliphatic hydrocarbons: Methylene chloride, 1:1-dichloroethane, 1:1:2:2-tetrachloroethane and 1:1-dichlorocyclohexane, methylene bromide, 1:1-dibromoethane, 1:2-dibromoethane, 1:1:2-tribromoethane, 1:1:2:2-tetrabromoethane, 1:2-dibromopropane, 1:2-dibromocyclohexane, tribromoethane. The method for carrying out the polymerizations according to the invention follows the known solution polymerization process of isoprene with organometallic mixed catalysts. The main difference is that the described dihalogenated hydrocarbons are added to the polymerization mixture. Based on the titanium tetrahalide, the quantities of the dihalogenated hydrocarbons lie between 0.05 and 100, preferably 0.1 to 10 mols of dihalogenated hydrocarbon per mol of titanium tetrachloride.

In general, the process may be carried out in the following manner:

A purified organic solvent is introduced into a vessel with exclusion of air and moisture, isoprene is added and this mixture is treated with the doubly halogenated hydrocarbon. As organic solvents there may be used, for example, aromatic or aliphatic hydrocarbons such as hexane, cyclohexane, benzene or toluene. Generally, an 8 to 30% by weight solution is used, preferably a 10 to 20% by weight solution, of the isoprene in the solvent. This mixture is generally prepared at temperatures between −5 and +50° C., preferably 15 to 35° C.

0.5 to 5, preferably 1 to 3 millimols of aluminium trialkyl/100 g. isoprene and a quantity of titanium tetrachloride such that the molar ratio between aluminium and titanium is between 0.9:1 and 1.25:1 are then added to this mixture. If desired, the catalyst may be prepared separately by mixing the components in a part of the solvent and if desired in a part of the isoprene and it may then be aged at temperatures of −5 to +50°, preferably 15 to 30° and then added to the mixture of solvent and isoprene. The aluminium trialkyls preferably used are those in which the alkyl radicals contain 2 to 6 carbon atoms, especially triethyl- and triisobutylaluminium. The polymerization may be carried out at temperatures between −5 and +50° C., preferably between 15 and 35° C., the temperature being adjusted to this range by suitable cooling. When polymerization is terminated, which may take 2 to 8 hours, a stabilizer such as 2:6-di-tertiary-butyl-4-methylphenol is added to the polymer solution in quantities of 0.2 to 1% based on the quantity of polyisoprene.

The resulting polymer is precipitated from the solution with low molecular weight aliphatic alcohols, for example, methanol, ethanol and isopropanol, and dried in vacuo at about 40 to 80° C. According to a preferred method of working up the product, the solvent is evaporated by introducing the polymer solution into hot water. During this operation, the chlorinated hydrocarbons also can be removed. In this method, they are so chosen that their boiling point is as close as possible to the boiling point of the solvent used.

The process according to the invention may be carried out batchwise or continuously.

The polymers obtained by the process described herein consist of 1:4-polyisoprene, at least 80% of the double bonds of which have a cis-configuration. Preferably polymers are produced in which the proportion of cis bonds is considerably higher, for example 95 to 98%. In the polymerization process according to the invention, the molecular weight of the 1:4-cis-polyisoprene obtained can be influenced by varying the catalyst concentration or the polymerization temperature so that in many cases the mastication which must be carried out before preparation of the mixture in the case of natural rubber can be avoided in the case of the polyisoprene obtained by the process of the invention. The polyisoprene rubber has the same fields of application as natural rubber.

EXAMPLE 1

(a) In a vessel equipped with stirrer, 1000 parts by volume of pure dry benzene are treated with 200 parts by weight of isoprene and 20 parts by volume of methylene chloride with the exclusion of air and moisture. 0.478 part by weight of aluminium triethyl and 0.756 part by weight of titanium-IV-chloride are added at room temperature (23° C.), the mixture being stirred during this operation. Polymerization starts at once. The reaction temperature rises to 35° C. within 6 hours. After this time, 4 parts by weight of N-methylol-diethanolamine and subsequently 2 parts by weight of 2:6-di-tertiary-butyl-4-methylphenol are stirred into the polymer solution. The polymer is precipitated with ethanol and dried in vacuo at 50° C. The yield is 182 parts by weight=91%; cis-1:4-linkage 97%, gel content 2% $[\eta]=3.9$.

(b) Experiment carried out for comparison.—The experiment described under Example 1(a) was repeated with the difference that no methylene chloride was used. The yield in this case is 34%=68 parts by weight of polyisoprene. Cis-1:4-linkage 97%, gel not detectable $[\eta]=2.1$.

EXAMPLES 2–10

The examples summarized in Table I were carried out by the method described under Example 1(a).

EXAMPLES 11–15

The examples summarized in Table II were carried out as described under Example 1(a).

TABLE II

| Example | 11 | 12 | 13 | 14 | 15 |
|---|---|---|---|---|---|
| Toluene (g.) | 900 | 900 | 900 | 900 | 900 |
| Isoprene (g.) | 200 | 200 | 200 | 200 | 200 |
| $CH_2Cl_2$ (g.) | 20 | | | | |
| $CH_3C \cdot HCl_2$ (g.) | | 20 | | 20 | |
| $CHCl_2 \cdot CHCl_2$ (g.) | | | 20 | | |
| $CCl_4$ (g.) | | | | | 20 |
| Al(iso $C_4H_9)_3$ | 0.872 | 0.872 | 0.872 | 0.872 | 0.872 |
| $TiCl_4$ | 0.756 | 0.756 | 0.756 | 0.756 | 0.756 |
| Polymerization time, hours | 5 | 5 | 5 | 5 | 5 |
| Polymerization temperature, °C | 25–30 | 25–30 | 25–30 | 25–30 | 25–30 |
| Percent yield | 21 | 78 | 65 | 80 | 96 |
| Percent cis-1:4 | 97.4 | 97.1 | 97.5 | 97.7 | 0 |
| $[\eta]$ | 1.95 | 2.91 | 3.02 | 2.87 | 0.12 |

EXAMPLES 16–20

Examples 16 to 20 were carried out as described in more detail under Example 1(a). The addition of 0.67% of tetrachloroethane (based on the quantity of benzene) increases the yield in cis-1:4-polyisoprene from 18% to 87%. When 1.3% to 4.0% (based on benzene) are added, the yields lie between 80 and 90%.

| Example No. | 16 | 17 | 18 | 19 | 20 |
|---|---|---|---|---|---|
| Benzene, parts by wt | 1,200 | 1,200 | 1,200 | 1,200 | 1,200 |
| Isoprene, parts by wt | 200 | 200 | 200 | 200 | 200 |
| $CHCl_2-CHl_2$, parts by wt | | 8 | 16 | 32 | 48 |
| $Al(C_2H_5)_3$, parts by wt | 0.545 | 0.545 | 0.545 | 0.545 | 0.545 |
| $TiCl_3$, parts by wt | 0.756 | 0.756 | 0.756 | 0.756 | 0.756 |
| Polymerization time, hours | 5 | 5 | 5 | 5 | 5 |
| Polymerization temperature, °C | 30 | 30 | 30 | 30 | 30 |
| Yield, percent | 18 | 87 | 90 | 86 | 80 |
| Cis-1:4-structure, percent | 97–98 | 97–98 | 97–98 | 97–98 | 97–98 |
| $[\eta]$ | 3.2 | 3.0 | 3.1 | 3.0 | 2.7 |
| Gel, percent | <2 | <2 | <2 | <2 | <2 |

Example 16 was included for the sake of comparison.

EXAMPLES 21–23

Examples 21 to 23 were carried out as described under Example 1(a) but with the use of n-hexane as solvent.

| Example No. | 21 | 22 | 23 |
|---|---|---|---|
| n-Hexane, parts by wt | 1,000 | 1,000 | 1,000 |
| Isoprene, parts by wt | 240 | 240 | 240 |
| $CHCl_2$-$CHCl_2$, parts by wt | | 8.0 | 16.0 |
| $Al(C_2H_5)_3$, parts by wt | 0.770 | 0.770 | 0.770 |
| $TiCl_3$, parts by wt | 1.050 | 1.050 | 1.050 |
| Polymerization time, hours | 5 | 5 | 5 |
| Polymerization temperature, °C | 30 | 30 | 30 |
| Cis-1:4-structure, percent | 97–97.5 | 97–97.5 | 97–97.5 |
| Yield, percent | 26 | 75 | 70 |
| Defo hardness/elasticity at 80° C | 325/16 | 625/23 | 900/34 |
| Mooney value ML-4'/100° C | | 46 | 59 |

Example 21 was included for the sake of comparison.

EXAMPLE 24

In a vessel equipped with stirrer, 1500 parts by volume of pure dry n-hexane and 240 parts by weight of isoprene were treated with 4.8 parts by weight of 1:1-2:2-dichloroethane air and moisture being excluded. The mixture is stirred and at the same time 0.77 part by weight af aluminium triethyl and 1.07 parts by weight of titanium-IV-chloride are added at room temperature. Polymerization starts at once, as indicated by the rise in temperature from 30 to 35° C. and a slow increase in the viscosity of the solution. After 5 hours of polymeriza-

TABLE I

| Example | 2 | 3 | 4 | 5 | 6 | 7 | 8 | 9 | 10 |
|---|---|---|---|---|---|---|---|---|---|
| Benzene (g.) | 900 | 900 | 900 | 900 | 900 | 900 | 900 | 900 | 00 |
| Isoprene (g.) | 200 | 200 | 200 | 200 | 200 | 200 | 200 | 200 | 200 |
| $CH_2Cl_2$ (g.) | | 10 | 20 | 30 | 40 | 60 | 20 | 20 | 20 |
| $Al(C_2H_5)_3$ (g.) | 0.478 | 0.478 | 0.478 | 0.478 | 0.478 | 0.478 | 0.457 | 0.485 | 0.514 |
| $TiCl_4$ (g.) | 0.756 | 0.756 | 0.756 | 0.756 | 0.756 | 0.756 | 0.756 | 0.756 | 0.756 |
| Polymerization time, hours | 4 | 4 | 4 | 4 | 4 | 4 | 4 | 4 | 4 |
| Polymerization temperature, °C | 25–30 | 25–30 | 25–30 | 25–30 | 25–30 | 25–30 | 25–30 | 25–30 | 25–30 |
| Percent yield | 25 | 54 | 65 | 78 | 85 | 83 | 75 | 68 | 61 |
| Percent cis-1:4 | 97.1 | 97.7 | 97.5 | 97.7 | 97.3 | 97.5 | 96.8 | 97.3 | 97.3 |
| $[\eta]$ | 0.98 | 2.15 | 2.30 | 3.80 | 3.91 | 4.18 | 3.10 | 2.90 | 2.81 |
| Percent gel | | | | | Traces | 11 | | | | tion, 4 parts by weight of N-methyldiethanolamine and 2 parts by weight of 2:6-ditertiary-butyl-4-methylphenol are stirred into the polymer solution. The polymer is precipitated from the solution in n-hexane with ethanol and dried in vacuo at 50° C.

The yield is 208 parts by weight. The proportion of cis-1:4-linkages in the monomer units is 97.2%, the viscosity of the solution $[\eta]=3.5$.

EXAMPLES 25–27

Examples 25 to 27 summarized in Table III were carried out as described under Example 24. Example 25 serves as comparison.

TABLE III

| Example No. | 25 | 26 | 27 |
|---|---|---|---|
| n-Hexane, parts by wt. | 1,200 | 1,200 | 1,200 |
| Isoprene, parts by wt. | 240 | 240 | 240 |
| CHCl$_2$–CHCl$_2$, parts by wt. | 0 | 1.6 | 4.8 |
| Al(C$_2$H$_5$)$_3$, parts by wt. | 0.77 | 0.77 | 0.77 |
| TiCl$_3$, parts by wt. | 1.07 | 1.07 | 1.07 |
| Polymerization time, hours | 5 | 5 | 5 |
| Polymerization temperature, ° C. | 30 | 30 | 30 |
| Cis-1:4-structure, percent | 97.0 | 97.3 | 97.2 |
| $[\eta]$ | 3.2 | 3.5 | 3.5 |
| Defo hardness/elasticity at 80° C. | 350/16 | 600/20 | 700/23 |
| Mooney value ML-4'-100° C. | 34 | 50 | 53 |
| Yield, percent | 25 | 83 | 85 |

EXAMPLES 28–30

Examples 28 to 30 were carried out according to Example 24, using benzene as solvent. They are summarized in Table IV.

TABLE IV

| Example No. | 28 | 29 | 30 |
|---|---|---|---|
| Benzene, parts by wt. | 1,200 | 1,200 | 1,200 |
| Isoprene, parts by wt. | 200 | 200 | 200 |
| CHCl$_2$–CHCl$_2$, parts by wt. | 4.8 | 4.8 | 4.8 |
| Al(C$_2$H$_5$)$_3$, parts by wt. | 0.631 | 0.595 | 0.545 |
| TiCl$_3$, parts by wt. | 0.892 | 0.825 | 0.756 |
| Polymerization time, hours | 5 | 5 | 5 |
| Polymerization temperature, ° C. | 30 | 30 | 30 |
| Cis-1:4-structure, percent | 97.2 | 97.4 | 97.0 |
| $[\eta]$ | 2.7 | 2.9 | 3.2 |
| Defo hardness/elasticity at 80° C. | 350/18 | 400/22 | 500/24 |
| Mooney value ML-4'/100° C. | 35 | 39 | 44 |
| Yield, percent | 85 | 85 | 81 |

EXAMPLES 31–35

Examples 31–35 were carried out in petroleum ether boiling between the limits of 40 to 80° C. as solvent. Example 31 serves as comparison. The individual experiments were carried out as described under Example 24 (Table V).

TABLE V

| Example No. | 31 | 32 | 33 | 34 | 35 |
|---|---|---|---|---|---|
| Petroleum ether, parts by wt. | 1,200 | 1,200 | 1,200 | 1,200 | 1,200 |
| Isoprene, parts by wt | 240 | 240 | 240 | 240 | 240 |
| CHCl$_2$–CHCl$_2$, parts by wt. | 0 | 0.16 | 0.48 | 1.6 | 4.8 |
| Al(C$_2$H$_5$)$_3$, part by wt. | 0.77 | 0.77 | 0.77 | 0.77 | 0.77 |
| TiCl$_4$, parts by wt. | 1.07 | 1.07 | 1.07 | 1.07 | 1.07 |
| Polymerization time, hours | 5 | 5 | 5 | 5 | 5 |
| Polymerization temperature, ° C. | 30 | 30 | 30 | 30 | 30 |
| Cis-1:4-structure, percent | >97 | >97 | >97 | >97 | >97 |
| Mooney value ML-4'/100° C. | | 42 | 47 | 50 | 53 |
| Yield, percent | 23 | 48 | 65 | 83 | 83 |

EXAMPLE 36

250 ml. portions of toluene were introduced into separate hot 500 ml. crown cap flasks which had been dried at 120° C. The toluene was dried by immediately introducing pure nitrogen and continuing the pass this through for 5 minutes at a rate of 5 to 7 litres per minute. The flasks were closed and into each flask 30 g. of isoprene were introduced through an injection cannula in the rubber seal of the crown cap.

When the flasks had been cooled to room temperature, aluminium triethyl was added in the form of a 20% solution in toluene. The quantity of aluminium triethyl was 2.8 mmols per 100 g. of isoprene. Thereafter, 1:1:2:2-tetrabromoethane or 1:2-dibromoethane was added. Finally, a 5% solution in toluene of titanium tetrachloride was added, the titanium concentration being 2.35 mmols per 100 g. of isoprene. The catalyst components were also introduced through the injection cannula. The flasks were kept in motion in a rotary basket in a water bath at 30° C. After 5 hours, 150 ml. of toluene containing 0.3 g. of 2:6-di-tertiary-butyl-4-methylphenol and 1 ml. of ethanol were filled into each flask. The flasks were rotated for a further 2 to 3 hours at room temperature and the polymer solutions were then poured into excess methyl alcohol. The precipitated polyisoprene was dried in vacuo at 50° C. The polymerization results are summarized in Table VI.

TABLE VI

| Compound added | Ml./100 g. of isoprene | Yield (percent) | Limiting viscosity $[\eta]$ | Cis-content, percent |
|---|---|---|---|---|
| Br$_2$CH–CHBr$_2$ | | 35 | 3.3 | 97 |
| | 0.65 | 80 | 3.7 | 97 |
| | 1.65 | 70 | 3.9 | |
| BrCH$_2$–CH$_2$Br | 1.6 | 82 | 3.7 | 97.5 |

EXAMPLE 37

In a vessel equipped with stirrer, 1500 ml. of dry n-hexane (water content <0.001%) were mixed with 200 g. of pure isoprene with exclusion of air and moisture. To this solution was added at room temperature, with stirring, 5.7 millimols of aluminium triethyl (in the form of 25% solution in hexane) and subsequently a brominated hydrocarbon and finally 4.7 millimols of titanium tetrachloride. The polymerization temperature was kept at 30° C. The polymerization reactions were stopped after 5 hours by stirring into the reaction mixture a solution of 2 g. of a phenolic stabilizer (2:6-di-tertiary butyl-4-methyl phenol) and 4 g. of N-methyl-diethanolamine in 50 ml. of toluene. The polymer was then precipitated from the solution with ethanol and dried in vacuo at 50° C. The results of the polymerization experiments are summarized in Table VII.

TABLE VII

| Bromine compound added | Molar ratio TiCl$_4$:bromine compound | Yield, percent | Mooney viscosity (ML-4'/100° C.) | Defo plasticity, DIN 53514 | Cis structure, percent |
|---|---|---|---|---|---|
| (a) | | 25 | 38 | | |
| (b) Br$_2$CH–CHBr$_2$ | 1:0.12 | 79 | 73 | 1,325/31 | 97 |
| (c) Br$_2$CH–CHBr$_2$ | 1:0.23 | 74 | 68 | 1,100/31 | 95 |
| (d) BrCH$_2$–CH$_2$Br | 1:0.5 | 50.5 | 62 | 950/32 | |
| (e) BrCH$_2$–CH$_2$Br | 1:1 | 53 | 46 | 800/31 | 97.5 |
| (f) 1:2-dibromocyclohexane | 1:0.25 | 50 | 65 | | 97 |

EXAMPLE 38

A series of further polymerization experiments were carried out with the use of toluene as solvent and exactly the same conditions and concentrations as in Example 2. The results are shown in Table VIII.

TABLE VIII

| Bromine compound | Molar ratio $TiCl_4$: bromine compound | Yield, percent | Mooney viscosity (ML-4'/100° C.) | Content in 3:4-structure, percent |
|---|---|---|---|---|
| (a) | | 28 | 35 | 2.5 |
| (b) $BrCH_2-CH_2Br$ | 1:3.7 | 75 | 41 | 2.0 |
| (c) $Br_3CH$ | 1:0.25 | 49 | 61 | |
| (d) $Br_2CH-CHBr_2$ | 1:1 | 78 | 44 | 2.2 |
| (e) $Br_2CH_2$ | 1:11.7 | 55.5 | 50 | 2.5 |

EXAMPLE 39

1000 parts by weight of n-hexane and 200 parts by weight of isoprene are placed in a vessel equipped with stirrer, air and moisture being excluded. While the mixture is stirred, 0.59 part by weight of aluminium triethyl, 10.0 parts by weight of dibromomethane and 0.845 part by weight of titanium-IV-chloride are added in the said sequence at 20° C. Polymerization of isoprene begins at once. The reaction temperature is kept at 20° C. by external cooling. 10 parts by weight of ethanol and 0.25 part by weight of 2:6-di-tertiary-butyl-4-methylphenol are stirred into the polymer solution after 4 hours. The polymer solution is precipitated with ethanol containing 0.1 g. of 2:6-di-tertiary-butyl-4-methylphenol per litre and is then dried in vacuo at 50° C. The yield is 105 parts by weight, the proportion of 1:4-cis linkages in the monomer units 97.3% and the solution viscosity $[\eta]=3.94$.

Examples IXa–h summarized in Table IX were carried out by the method described in Example 39.

Examples 39a–c are comparison examples.

TABLE IX

| Example No | 39a | 39b | 39c | 39d | 39f | 39g | 39h |
|---|---|---|---|---|---|---|---|
| Hexane, parts by wt | 1,000 | 1,000 | 1,000 | 1,000 | 1,000 | 1,000 | 1,000 |
| Isoprene, parts by wt | 200 | 200 | 200 | 200 | 200 | 200 | 200 |
| Isopropylbromide, parts by wt | | | 0.66 | | | | |
| Tert.-butyl bromide, parts by wt | | | | 1.25 | | | |
| Methylenebromide, parts by wt | | | | | 2.5 | 5.0 | 30 |
| Bromoform, parts by wt | | | | | | | 0.345 |
| Al($C_2H_5$)$_3$, parts by wt | 0.59 | 0.59 | 0.59 | 0.59 | 0.59 | 0.59 | 0.59 |
| $TiCl_4$ parts by wt | 0.845 | 0.845 | 0.845 | 0.845 | 0.845 | 0.845 | 0.845 |
| Polymerization temperature, °C | 25 | 25 | 25 | 25 | 25 | 25 | 25 |
| Polymerization time, hours | 5 | 5 | 5 | 5 | 5 | 5 | 5 |
| Yield, percent | 29 | 31 | 0 | 45 | 50 | 56 | 41 |
| Cis-1:4, percent | 97.5 | 96.3 | | 97.1 | 96.9 | 96.9 | 97.5 |
| ($\eta$) | 3.0 | 3.9 | | 3.8 | 3.5 | 3.5 | |

EXAMPLE 40

A polymerization experiment was carried out under exactly the same conditions and with the same concentrations as in Example 37, the brominated hydrocarbon used being 1:1:2-tribromoethane. The molar ratio of titanium tetrachloride/1:1:2-tribromoethane was 1:0.12. After a polymerization time of 4 hours, the polyisoprene yield was 65%. The polymer had the following characteristics:

3:4-content: 2.2%
Mooney viscosity (ML-4' 100° C.): 52
Defo plasticity: 900/33.

We claim:

1. Process for producing polyisoprene having predominantly 1,4-cis-linkages which comprises solution polymerizing isoprene in hydrocarbon solvents selected from the group consisting of aliphatic, cycloaliphatic, and aromatic hydrocarbons with an organometallic mixed catalyst composed of an aluminium trialkyl and titanium tetrachloride, said polymerization being effected in the presence of 0.05 to 100 moles per mole titanium tetrachloride, of an at least dihalogenated hydrocarbon selected from the group consisting of lower aliphatic and cycloaliphatic hydrocarbons.

2. Process of claim 1 wherein said dihalogenated hydrocarbon is a lower aliphatic hydrocarbon which is dichlorinated on at least one carbon atom.

3. Process of claim 1 wherein said dihalogenated hydrocarbon is a brominated hydrocarbon containing at least two bromine atoms on the same carbon atom.

4. Process of claim 3 wherein said brominated hydrocarbon contains at least two bromine atoms on adjacent carbon atom.

5. Process of claim 1 wherein said chlorinated hydrocarbon is methylene chloride.

6. Process of claim 1 wherein said chlorinated hydrocarbon is 1,1,2,2-tetrachloroethane.

7. Process of claim 1 wherein said chlorinated hydrocarbon is 1,1-dichloroethane.

8. Process of claim 1 wherein said chlorinated hydrocarbon is dibromomethane.

9. Process of claim 1 wherein said chlorinated hydrocarbon is 1,1,2,2-tetrabromoethane.

10. Process of claim 1 wherein said chlorinated hydrocarbon is 1,2-dibromoethane.

11. A process for producing polyisoprene, which comprises subjecting isoprene to polymerization in a benzene solvent containing an aluminium triethyl-titanium-IV-chloride catalyst, the polymerization system also containing 0.1–10 mols of methylene chloride, and recovering isoprene having at least 80% of its double bonds in 1,4-cis configuration.

12. Process of claim 11 wherein the polyisoprene is recover by introducing the polymer solution into hot water, whereby the benzene and the methylene chloride is evaporated.

13. Process of claim 11 wherein the polyisoprene is precipitated with ethanol and dried.

14. Process of claim 1 wherein said polymerization is effected in the presence of 0.1 to 10 mols per mol titanium tetrachloride of said at least dihalogenated hydrocarbon.

No references cited.

JOSEPH L. SCHOFER, *Primary Examiner.*

R. A. GAITHER, *Assistant Examiner.*